(12) United States Patent
Ricciuti et al.

(10) Patent No.: US 9,413,081 B2
(45) Date of Patent: Aug. 9, 2016

(54) CIRCUIT PROTECTION SYSTEM, AND WIRETAP CONNECTION ASSEMBLY AND METHOD THEREFOR

(71) Applicant: EATON CORPORATION, Cleveland, OH (US)

(72) Inventors: Anthony Thomas Ricciuti, Bethel Park, PA (US); Thomas Kenneth Fogle, Pittsburgh, PA (US); Joseph Philip Fello, Verona, PA (US)

(73) Assignee: EATON CORPORATION, Cleveland, OH (US)

( * ) Notice: Subject to any disclaimer, the term of this patent is extended or adjusted under 35 U.S.C. 154(b) by 133 days.

(21) Appl. No.: 14/276,517

(22) Filed: May 13, 2014

(65) Prior Publication Data
US 2015/0333417 A1  Nov. 19, 2015

(51) Int. Cl.
*H01R 4/24* (2006.01)
*H01H 83/00* (2006.01)
(Continued)

(52) U.S. Cl.
CPC .............. *H01R 4/2416* (2013.01); *H01H 83/00* (2013.01); *H01R 4/2445* (2013.01); *H02H 3/08* (2013.01); *H01H 71/08* (2013.01); *Y10T 29/49195* (2015.01)

(58) Field of Classification Search
CPC .. H01R 4/2433; H01R 4/2429; H01R 4/2408; H01R 4/2483; H01R 4/2404
USPC ......... 439/389, 404, 411, 412, 417, 419, 449, 439/470, 658
See application file for complete search history.

(56) References Cited

U.S. PATENT DOCUMENTS 2,647,245 A * 7/1953 Gilbert ................. H01R 4/2404
  439/417
2,802,083 A * 8/1957 Lapeyre ................. H01H 1/585
  200/298

(Continued)

FOREIGN PATENT DOCUMENTS

DE   10 2010 014 615 A1   10/2011
EP    1 931 003 A1   6/2008
WO    2006076473 A1   7/2006

OTHER PUBLICATIONS

European Patent Office, "International Search Report and Written Opinion for PCT/US2015/022880", Jun. 12, 2015, 13 pp.

*Primary Examiner* — Hien Vu
(74) *Attorney, Agent, or Firm* — Eckert Seamans Cherin & Mellott, LLC; Grant E. Coffield; John P. Powers

(57) ABSTRACT

A wiretap connection assembly is for a circuit protection system. The circuit protection system includes at least one wire conductor and at least one circuit interrupter. The circuit interrupter includes a line conductor and a load conductor. The wire conductor has an electrically conductive inner core and an electrically insulating outer covering. The wiretap connection assembly includes a wire severing assembly structured to sever the wire conductor, and a number of wiretap assemblies. Each wiretap assembly includes a tapping portion and a connecting portion. The tapping portion is structured to pierce through the electrically insulating outer covering of a corresponding portion of the wire conductor and into the electrically conductive inner core. The connecting portion is structured to electrically connect the electrically conductive inner core of the corresponding portion of the wire conductor to a corresponding one of the line conductor and the load conductor.

17 Claims, 3 Drawing Sheets

(51) Int. Cl.
*H02H 3/08* (2006.01)
*H01H 71/08* (2006.01)

(56) References Cited

U.S. PATENT DOCUMENTS

| | | |
|---|---|---|
| 4,679,881 A | 7/1987 | Galvin et al. |
| 4,822,298 A * | 4/1989 | Gerke ................. H01R 4/2445 439/402 |
| 7,121,871 B2 | 10/2006 | Duesterhoeft et al. |
| 7,922,541 B2 * | 4/2011 | Maenhout ............ H01R 4/2433 439/625 |
| 8,585,430 B1 * | 11/2013 | Larner ................. H01R 4/2433 439/391 |
| 2004/0198090 A1 | 10/2004 | Morizaki |
| 2006/0160403 A1 | 7/2006 | Duesterhoeft et al. |
| 2010/0099296 A1 * | 4/2010 | Temblador ........... H01R 4/2408 439/431 |

\* cited by examiner

CIRCUIT PROTECTION SYSTEM, AND WIRETAP CONNECTION ASSEMBLY AND METHOD THEREFOR

BACKGROUND

1. Field

The disclosed concept relates generally to electrical systems and, more particularly, to electrical systems, such as circuit protection systems. The disclosed concept also relates to wiretap connection assemblies for circuit protection systems. The disclosed concept further relates to wiretap connection methods for circuit protection systems.

2. Background Information

Circuit protection for electrical systems generally requires the use of a relatively significant amount of available space. Installing circuit protection for the individual electrical circuits of a residential application, for example, requires ample space to break the circuit, and then mount and install a junction box. Circuit protection devices, such as for example circuit interrupters (e.g., without limitation, protective fuses; circuit breakers) for the individual electrical circuits are mounted within the junction box. The space required for the junction box and associated hardware and switchgear is not always available or convenient.

There is room, therefore, for improvement in circuit protection systems, and in wiretap connection assemblies and methods therefor.

SUMMARY

These needs and others are met by embodiments of the disclosed concept, which are directed to a wiretap connection assembly and method for circuit protection systems.

As one aspect of the disclosed concept, a wiretap connection assembly is provided for a circuit protection system. The circuit protection system includes at least one wire conductor and at least one circuit interrupter. The circuit interrupter includes a line conductor and a load conductor. The wire conductor has an electrically conductive inner core and an electrically insulating outer covering. The wiretap connection assembly comprises: a wire severing assembly structured to sever the wire conductor; and a number of wiretap assemblies each comprising a tapping portion and a connecting portion. The tapping portion is structured to pierce through the electrically insulating outer covering of a corresponding portion of the wire conductor and into the electrically conductive inner core. The connecting portion is structured to electrically connect the electrically conductive inner core of the corresponding portion of the wire conductor to a corresponding one of the line conductor and the load conductor.

Each of the wiretap assemblies may further comprise a first clamping member and a second clamping member disposed opposite the first clamping member, wherein the second clamping member is structured to be coupled to the first clamping member in order to clamp the corresponding portion of the wire conductor therebetween. The tapping portion may comprise a number of piercing elements extending outwardly from at least one of the first clamping member and the second clamping member. The connecting portion may comprise a number of conductors each being structured to electrically connect one of the piercing elements to a corresponding one of the line conductor and the load conductor, thereby electrically connecting the electrically conductive core to the corresponding one of the line conductor and the load conductor.

The wire severing assembly may comprise a cut edge structured to sever the wire conductor into a first wire segment and a second wire segment. The wire severing assembly may further comprise a first member, a second member, and a plurality of fasteners for fastening the first member to the second member.

As another aspect of the disclosed concept, a circuit protection system comprises: at least one wire conductor including an electrically conductive inner core and an electrically insulating outer covering; at least one circuit interrupter comprising a line conductor and a load conductor; and at least one wiretap connection assembly comprising: a wire severing assembly structured to sever the wire conductor, and a number of wiretap assemblies each comprising a tapping portion and a connecting portion. The tapping portion is structured to pierce through the electrically insulating outer covering of a corresponding portion of the at least one wire conductor and into the electrically conductive inner core. The connecting portion is structured to electrically connect the electrically conductive inner core to a corresponding one of the line conductor and the load conductor.

As a further aspect of the disclosed concept, a wiretap connection method is provided for a circuit protection system including a circuit interrupter having a line conductor and a load conductor. The method comprises: providing a wiretap connection assembly comprising a wire severing assembly, a number of wiretap assemblies, employing the wire severing assembly to sever a wire conductor, piercing through an electrically insulating outer covering of the wire conductor into an electrically conductive inner core of the wire conductor with a tapping portion of a corresponding one of the wiretap assemblies, and electrically connecting the electrically conductive inner core to a corresponding one of the line conductor and the load conductor with a connecting portion of the corresponding one of the wiretap assemblies.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

For purposes of illustration, embodiments of the disclosed concept will be shown and described herein as employed with a circuit breaker, although it will be appreciated that they could alternatively be employed with any other known or suitable circuit interrupter (e.g., without limitation, fuse; electrical switching apparatus), without departing from the scope of the disclosed concept.

As employed herein, the term "fastener" refers to any suitable connecting or tightening mechanism expressly including, but not limited to, rivets, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 1:
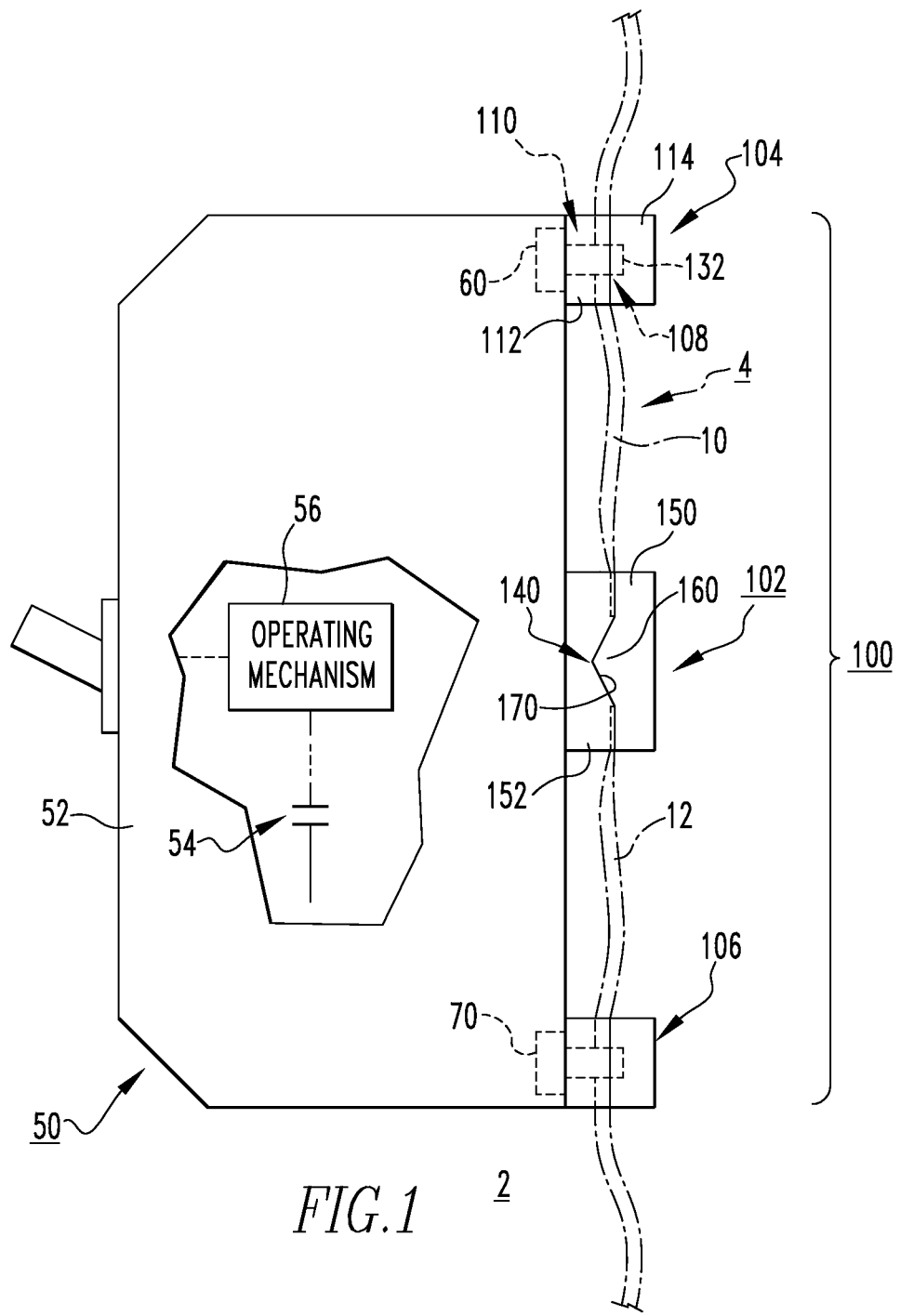
FIG. 1 is a side elevation simplified view of a circuit protection system and wiretap connection assembly therefor, in accordance with an embodiment of the disclosed concept.
Figure 4:
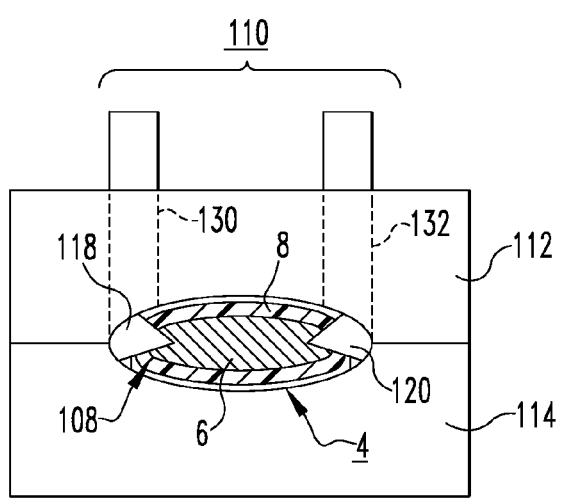
FIG. 4 is an end elevation view of the portion of the wiretap connection assembly of FIG. 2.

FIG. 1 shows a wiretap connection assembly 100 for a circuit protection system 2, in accordance with one non-limiting example embodiment of the disclosed concept. In the example of FIG. 1, the circuit protection system 2 includes at least one wire conductor 4 (one is shown in simplified form in phantom line drawing) and at least one circuit interrupter 50 (e.g., without limitation, circuit breaker) (one is shown). The circuit breaker 50, or other suitable circuit interrupter (e.g., without limitation, fuse (not shown)) includes a line conductor 60 (shown in simplified form in hidden line drawing) and a load conductor 70 (shown in simplified form in hidden line drawing). The wire conductor 4 preferably includes an electrically conductive inner core 6 and an electrically insulating outer covering 8, as best shown in FIG. 4.

Figure 6:
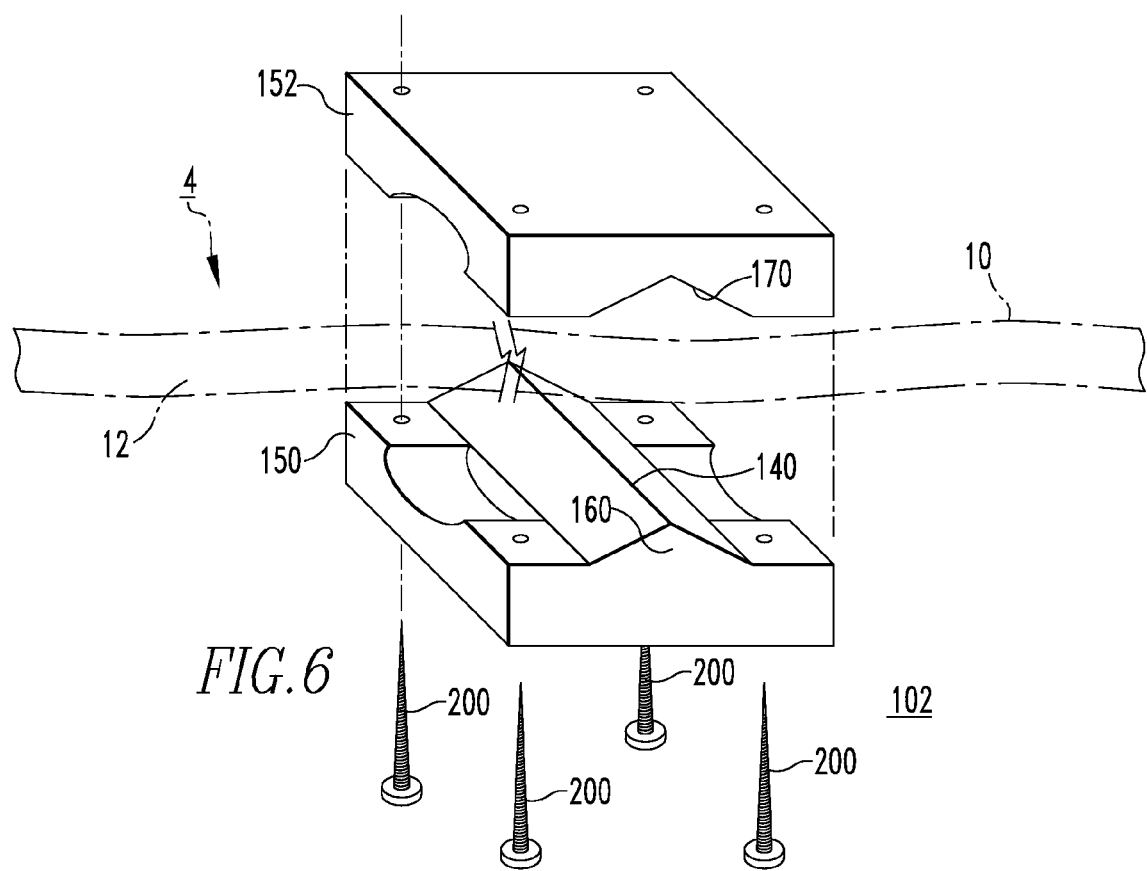
FIG. 6 is an exploded isometric view of the portion of the wiretap connection assembly of FIG. 5.

The wiretap connection assembly 100 includes a wire severing assembly 102 structured to sever (i.e., cut) the wire conductor 4, as shown in FIGS. 1 and 6. The wiretap connection assembly 100 further includes a number of wiretap assemblies 104,106 (two are shown in FIG. 1) each having a tapping portion 108 and a connecting portion 110. For ease of illustration and economy of disclosure, it will be appreciated that only one of the wiretap assemblies 104 will be described, in detail, herein. However, it will be appreciated that the other wiretap assembly 106 is preferably substantially identical.

The example circuit breaker 50 includes a housing, separable contacts 54 (shown in simplified form in FIG. 1) enclosed by the housing 52, and an operating mechanism 56 (shown in simplified form in FIG. 1) structured to open and close the separable contacts 54. As will now be described in greater detail, the disclosed wiretap connection assembly 100 advantageously provides a mechanism for tapping directly into the wire conductor 4 that feeds that circuit. Thus, circuit protection in accordance with the disclosed concept can be effectively achieved relatively quickly and easily, and in areas with space restrictions that would otherwise prevent the use of a conventional junction box.

As will be further discussed, each of the wiretap assemblies 104,106 taps a corresponding portion or segment 10,12 of the severed wire conductor 4 for electrical connection to a corresponding one of the line conductor 60 and load conductor 70, respectively. The wire severing assembly 102, in addition to severing the wire conductor 4, preferably also serves to help maintain dielectric stability between the connections. Accordingly, once installed, the severed wire segments 10,12 are bridged by the circuit breaker 50 or other suitable circuit interrupter (not shown).

Continuing to refer to FIG. 1, and also to FIGS. 2-6, it will be appreciated that the tapping portion 108 pierces through the electrically insulating outer covering 8 of a corresponding portion of the wire conductor 4 and into the electrically conductive inner core 6, as best shown in FIG. 4. The connecting portion 110 electrically connects the electrically conductive inner core 6 (FIG. 4) of the corresponding portion of the wire conductor 4 to a corresponding one of the line conductor 60 and load conductor 70 of the circuit breaker 50 (or other suitable circuit interrupter (not shown)), as shown in FIG. 1.

Figure 2:
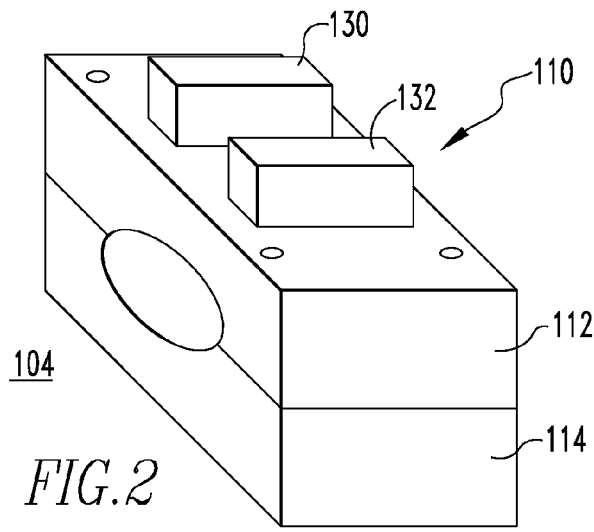
FIG. 2 is an isometric view of a portion of the wiretap connection assembly of FIG. 1.
Figure 3:
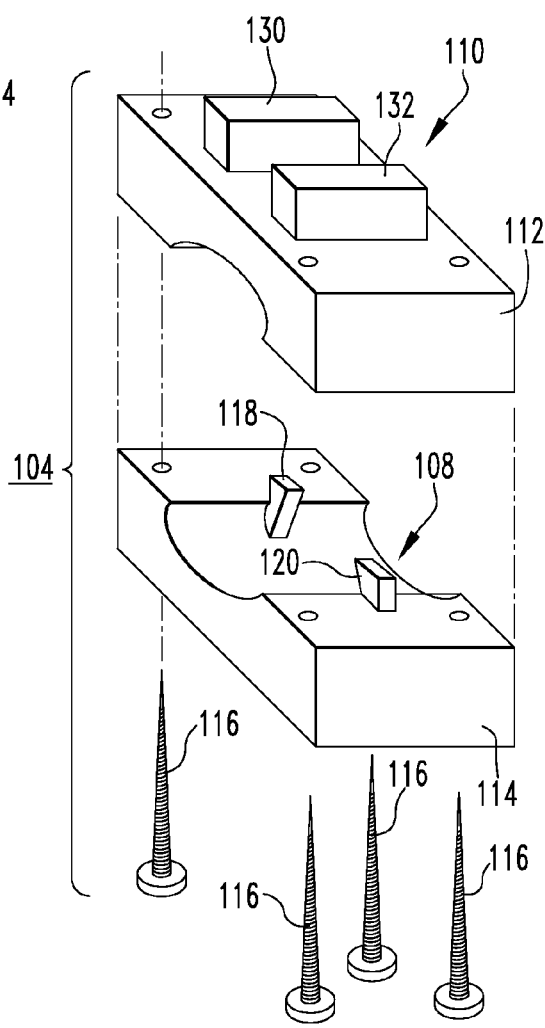
FIG. 3 is an exploded isometric view of the portion of the wiretap connection assembly of FIG. 2.

As shown in FIGS. 2-4, the example wiretap assembly 104 further includes a first clamping member 112 and an opposing second clamping member 114. The second clamping member 114 is coupled to the first clamping member 112 in order to clamp the corresponding portion of the wire conductor 4 therebetween, as best shown in FIG. 4. Each of the wiretap assemblies 104,106 preferably further includes a plurality of fasteners 116, shown in FIG. 3, which fasten the first clamping member 112 and the second clamping member 114 together. The fasteners 116 preferably also fasten the wiretap assemblies 104,106 to the circuit breaker housing 52, as shown in FIG. 1.

As shown in FIGS. 3 and 4, the tapping portion 108 of the example wiretap assembly 104 preferably includes a number of piercing elements 118,120 extending outwardly from at least one of the first clamping member 112 and the second clamping member 114. In the example shown, the piercing elements are a first barb 118 and a second barb 120 disposed opposite from the first barb 118. It will be appreciated, however, that any known or suitable alternative type, number and/or configuration of suitable piercing elements (not shown) could be employed, without departing from the scope of the disclosed concept.

As shown in FIGS. 1 and 4, the connecting portion 110 of the wiretap assembly 104 includes a number of conductors 130,132 (two are shown). Each of the conductors 130,132 electrically connects one of the piercing elements 118,120 (e.g., without limitation, barbs) to a corresponding one of the line conductor 60 and the load conductor 70 of the circuit breaker 50 (see, for example, FIG. 1). In this manner, the electrically conductive core 6 (FIG. 4) of the wire conductor 4 is electrically connected to the corresponding line conductor 60 or load conductor 70.

Referring again to FIG. 1, in the example shown and described herein, the number of wiretap assemblies is a first wiretap assembly 104 and a second wiretap assembly 106, wherein the wiring assembly 102 is disposed between the first and second wiretap assemblies 104,106. As previously discussed, the wire severing assembly 102 severs (i.e., cuts) the wire conductor 4 into a first wire segment 10 and a second wire segment 12. The tapping portion 108 of the first wiretap assembly 104 pierces the electrically insulating outer covering 8 of the first wire segment 10 and electrically contacts the electrically conductive inner core 6 of the first wire segment 10. The connecting portion 110 of the first wiretap assembly 104 electrically connects the first wire segment 10 to the line conductor 60. It will be appreciated that the corresponding like components of the second wiretap assembly 106 are not specifically shown or described herein, but are substantially identical and function in substantially the same manner. That is, the tapping portion 108 of the second wiretap assembly 106 pierces the electrically insulating outer covering 8 of the second wire segment 12 and electrically contacts the electrically conductive inner core 6 of the second wire segment 12. Further, the connecting portion 10 of the second wiretap assembly 106 electrically connects the second wire segment 12 to the load conductor 70, as generally shown in FIG. 1.

Figure 5:
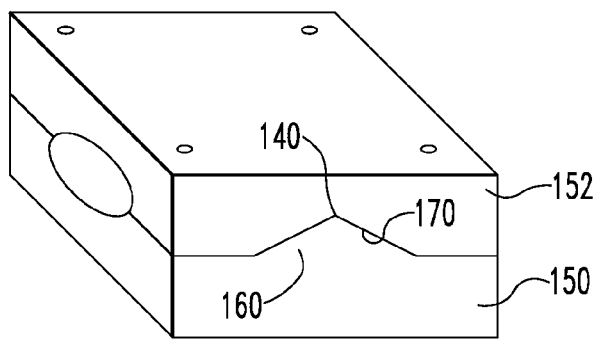
FIG. 5 is an isometric view of another portion of the wiretap connection assembly of FIG. 1.

Referring to FIGS. 5 and 6, it will be appreciated that the example wire severing assembly 102 preferably includes a cut edge 140, which is structured to perform the aforementioned severing (i.e., cutting) function of the wire conductor 4 into the first wire segment 10 and second wire segment 12. The wire severing assembly 102 preferably further includes a first member 150, a second member 152, and a plurality of fasteners 200. The fasteners 200 fasten (e.g., without limitation, clamp) the first and second members 150,152 together, and also serve to fasten the wire severing assembly 102 to the circuit breaker housing 52, as shown in FIG. 1. The cut edge 140 comprises a projection 160, which extends outwardly from the first member 150. The second member 152 includes a corresponding recess 170, which is structured to receive the projection 160, as shown in FIG. 5.

In operation, when the first member 150 is fastened to the second member 152, with the wire conductor 4 disposed therebetween, the cut edge 140 cuts the wire conductor 4 into the aforementioned first and second wire segments 10,12, as shown in simplified form in phantom line drawing in FIG. 6. It will be appreciated that the projection 160, which in the example shown and described herein has a generally triangular sloped configuration, also functions to advantageously separate the first and second wire segments 10,12, as shown in FIG. 1, in order to help maintain dielectric stability of the assembly.

It will be appreciated that although the example circuit protection system 2 (FIG. 1) shown and described herein includes only one circuit interrupter (e.g., without limitation, circuit breaker 50) and one wiretap connection assembly 100 therefor, for directly tapping into a single wire conductor 4, is within the foreseeable scope of the disclosed concept to employ any known or suitable alternative number, type and/or configuration of wiretap assemblies (not shown) in cooperation with any known or suitable number, type and/or configuration of alternative circuit interrupter(s) (e.g., without limitation, fuse(s) not shown).

Accordingly, the disclosed circuit protection assembly 2 and wiretap connection assembly 100 therefor provides an effective mechanism for tapping directly into a wire conductor 4 that feeds a circuit, to relatively quickly and easily provide circuit protection. Once installed, the severed wire conductor 4, and in particular, the severed wired segments 10,12 thereof, are bridged by the circuit interrupter 50. Thus, among other benefits, circuit protection can be provided even in areas with space restrictions, which would prevent the use of a conventional junction box.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A wiretap connection assembly for a circuit protection system, said circuit protection system comprising at least one wire conductor and at least one circuit interrupter, said circuit interrupter comprising a line conductor, a load conductor, and a housing, said wire conductor having an electrically conductive inner core and an electrically insulating outer covering, said wiretap connection assembly comprising:

a wire severing assembly structured to sever said wire conductor, said wire severing assembly being separate and distinct from the housing, and being disposed externally on a side of the housing; and a number of wiretap assemblies each comprising a tapping portion and a connecting portion, wherein said tapping portion is structured to pierce through the electrically insulating outer covering of a corresponding portion of said wire conductor and into the electrically conductive inner core, wherein said connecting portion is structured to electrically connect the electrically conductive inner core of said corresponding portion of said wire conductor to a corresponding one of said line conductor and said load conductor;

wherein each of said wiretap assemblies further comprises a first clamping member and a second clamping member disposed opposite said first clamping member; wherein each of said first clamping member and said second clamping member is separate and distinct from the housing; and wherein said second clamping member is structured to be coupled to said first clamping member in order to clamp said corresponding portion of said wire conductor therebetween.

2. The wiretap connection assembly of claim 1 wherein each of said wiretap assemblies further comprises a plurality of fasteners; and wherein said fasteners are structured to fasten said first clamping member and said second clamping member together and to the housing of said circuit interrupter.

3. The wiretap connection assembly of claim 1 wherein said tapping portion comprises a number of piercing elements extending outwardly from at least one of said first clamping member and said second clamping member; and wherein said number of piercing elements are disposed external the housing.

4. The wiretap connection assembly of claim 3 wherein said number of piercing elements is a first barb and a second barb disposed opposite said first barb.

5. The wiretap connection assembly of claim 3 wherein said connecting portion comprises a number of conductors each being structured to electrically connect one of said piercing elements to a corresponding one of said line conductor and said load conductor, thereby electrically connecting the electrically conductive core to said corresponding one of said line conductor and said load conductor.

6. The wiretap connection assembly of claim 5 wherein said number of wiretap assemblies is a first wiretap assembly and a second wiretap assembly; wherein said wire severing assembly is disposed between said first wiretap assembly and said second wiretap assembly; wherein said wire severing assembly is structured to sever said wire conductor into a first wire segment and a second wire segment; wherein said tapping portion of said first wiretap assembly is structured to pierce the electrically insulating outer covering of said first wire segment and to electrically contact the electrically conductive inner core of said first wire segment; wherein said connecting portion of said first wiretap assembly is structured to electrically connect said first wire segment to said line conductor; wherein said tapping portion of said second wiretap assembly is structured to pierce the electrically insulating outer covering of said second wire segment and to electrically contact the electrically conductive inner core of said second wire segment; and wherein said connecting portion of said second wiretap assembly is structured to electrically connect said second wire segment to said load conductor.

7. The wiretap connection assembly of claim 1 wherein said wire severing assembly comprises a cut edge structured to sever said wire conductor into a first wire segment and a second wire segment.

8. The wiretap connection assembly of claim 7 wherein said wire severing assembly further comprises a first member, a second member, and a plurality of fasteners for fastening said first member to said second member; wherein said cut edge comprises a projection extending outwardly from said first member; wherein said second member includes a recess structured to receive said projection; wherein, when said first member is fastened to said second member with said wire conductor disposed therebetween, said cut edge is structured to cut said wire conductor into said first wire segment and said second wire segment; and wherein said projection is structured to separate said first wire segment from said second wire segment.

9. A circuit protection system comprising:
   at least one wire conductor including an electrically conductive inner core and an electrically insulating outer covering;
   at least one circuit interrupter comprising a line conductor, a load conductor, and a housing; and
   at least one wiretap connection assembly comprising:
   a wire severing assembly structured to sever said wire conductor, said wire severing assembly being separate and distinct from the housing, and being disposed externally on a side of the housing, and
   a number of wiretap assemblies each comprising a tapping portion and a connecting portion,
   wherein said tapping portion is structured to pierce through the electrically insulating outer covering of a corresponding portion of said at least one wire conductor and into the electrically conductive inner core,
   wherein said connecting portion is structured to electrically connect the electrically conductive inner core to a corresponding one of said line conductor and said load conductor;
   wherein each of said wiretap assemblies further comprises a first clamping member, a second clamping member disposed opposite said first clamping member, and a plurality of fasteners; wherein each of said first clamping member and said second clamping member is separate and distinct from the housing; wherein said fasteners fasten said first clamping member and said second clamping member together thereby clamping said corresponding portion of said wire conductor therebetween; and wherein said fasteners fasten said first clamping member, said second clamping member and said corresponding portion of said wire conductor to the housing of said circuit interrupter.

10. The circuit protection assembly of claim 9 wherein said tapping portion comprises a number of piercing elements extending outwardly from at least one of said first clamping member and said second clamping member; wherein said number of piercing elements are disposed external the housing; and wherein said connecting portion comprises a number of conductors each electrically connecting one of said piercing elements to a corresponding one of said line conductor and said load conductor, thereby electrically connecting the electrically conductive core to said corresponding one of said line conductor and said load conductor.

11. The circuit protection assembly of claim 10 wherein said number of wiretap assemblies is a first wiretap assembly and a second wiretap assembly; wherein said wire severing assembly is disposed between said first wiretap assembly and said second wiretap assembly; wherein said wire severing assembly severs said wire conductor into a first wire segment and a second wire segment; wherein said tapping portion of said first wiretap assembly pierces the electrically insulating outer covering of said first wire segment and electrically contacts the electrically conductive inner core of said first wire segment; wherein said connecting portion of said first wiretap assembly electrically connects said first wire segment to said line conductor; wherein said tapping portion of said second wiretap assembly pierces the electrically insulating outer covering of said second wire segment and electrically contacts the electrically conductive inner core of said second wire segment; and wherein said connecting portion of said second wiretap assembly electrically connects said second wire segment to said load conductor.

12. The circuit protection assembly of claim 9 wherein said wire severing assembly comprises a first member, a second member, a plurality of fasteners for fastening said first member to said second member, and a cut edge; wherein said cut edge comprises a projection extending outwardly from said first member; wherein said second member includes a recess for receiving said projection; wherein, when said first member is fastened to said second member with said wire conductor disposed therebetween, said cut edge cuts said wire conductor into a first wire segment and a second wire segment; and wherein said projection separates said first wire segment from said second wire segment.

13. A wiretap connection method for a circuit protection system including a circuit interrupter having a line conductor, a load conductor, and a housing, the method comprising:
   providing a wiretap connection assembly comprising a wire severing assembly, a number of wiretap assemblies, said wire severing assembly being separate and distinct from the housing, and being disposed externally on a side of the housing,
   employing said wire severing assembly to sever a wire conductor, piercing through an electrically insulating outer covering of said wire conductor into an electrically conductive inner core of said wire conductor with a tapping portion of a corresponding one of said wiretap assemblies, and
   electrically connecting the electrically conductive inner core to a corresponding one of said line conductor and said load conductor with a connecting portion of said corresponding one of said wiretap assemblies;
   wherein each of said wiretap assemblies further comprises a first clamping member and a second clamping member disposed opposite said first clamping member; wherein each of said first clamping member and said second clamping member is separate and distinct from the housing; and wherein said method further comprises:
   clamping said corresponding portion of said severed wire conductor between said first clamping member and said second clamping member.

14. The method of claim 13 wherein each of said wiretap assemblies further comprises a plurality of fasteners; and wherein said method further comprises:
   fastening said first clamping member and said second clamping member together with said fasteners to clamp said corresponding portion of said wire conductor therebetween, and
   fastening said first clamping member, said second clamping member and said corresponding portion of said wire conductor to the housing of said circuit interrupter.

15. The method of claim 13 wherein said tapping portion comprises a number of piercing elements extending outwardly from at least one of said first clamping member and said second clamping member; wherein said number of piercing elements are disposed external the housing; wherein said connecting portion comprises a number of conductors; and wherein the method further comprises:
   electrically connecting each of said piercing elements to a corresponding one of said line conductor and said load conductor with a corresponding one of said conductors of said connecting portion, thereby electrically connecting the electrically conductive core to said corresponding one of said line conductor and said load conductor.

16. The method of claim 15 wherein said number of wiretap assemblies is a first wiretap assembly and a second wiretap assembly; wherein said wire severing assembly is disposed between said first wiretap assembly and said second wiretap assembly; and wherein the method further comprises:

severing said wire conductor into a first wire segment and a second wire segment with said wire severing assembly, piercing the electrically insulating outer covering of said first wire segment and electrically contacting the electrically conductive inner core of said first wire segment with said tapping portion of said first wiretap assembly, electrically connecting said first wire segment to said line conductor with said connecting portion of said first wiretap assembly, piercing the electrically insulating outer covering of said second wire segment and electrically contacting the electrically conductive inner core of said second wire segment with said tapping portion of said second wiretap assembly, and electrically connecting said second wire segment to said load conductor with said connecting portion of said second wiretap assembly.

17. The method of claim 13 wherein said wire severing assembly comprises a first member, a second member, a plurality of fasteners, and a cut edge; wherein said cut edge comprises a projection extending outwardly from said first member; wherein said second member includes a recess for receiving said projection; and wherein said method further comprises:

inserting said wire conductor between said first member and said second member, fastening said first member to said second member with said plurality of fasteners, cutting said wire conductor into a first wire segment and a second wire segment with said cut edge, and separating said first wire segment from said second wire segment with said projection.

\* \* \* \* \*